(12) United States Patent
Park et al.

(10) Patent No.: US 8,186,839 B2
(45) Date of Patent: May 29, 2012

(54) OPTICAL MODULE FOR OBSERVING EVENT OR OBJECT

(75) Inventors: Il Hung Park, Sungnam (KR); Jae Hyoung Park, Seoul (KR)

(73) Assignee: Industry Collaboration Foundation of Ewha University, Seoul (KR)

( * ) Notice: Subject to any disclaimer, the term of this patent is extended or adjusted under 35 U.S.C. 154(b) by 1041 days.

(21) Appl. No.: 11/753,713

(22) Filed: May 25, 2007

(65) Prior Publication Data

US 2008/0186605 A1 Aug. 7, 2008

(30) Foreign Application Priority Data

Feb. 5, 2007 (KR) .......................... 10-2007-0011663

(51) Int. Cl.
*G02B 5/08* (2006.01)
*H01J 3/14* (2006.01)
(52) U.S. Cl. ......... 359/846; 359/850; 250/216; 250/234
(58) Field of Classification Search ............... 359/200.8, 359/201.2, 212, 2, 223.1, 225.1, 226.1, 846, 359/212.1, 850, 865; 250/203.1, 216, 334, 250/234
See application file for complete search history.

(56) References Cited

U.S. PATENT DOCUMENTS

| | | | | |
|---|---|---|---|---|
| 3,476,948 A * | 11/1969 | Mengers | | 340/555 |
| 4,527,055 A * | 7/1985 | Harkless et al. | | 250/234 |
| 5,049,740 A * | 9/1991 | Pines et al. | | 250/235 |
| 5,418,364 A * | 5/1995 | Hale et al. | | 250/334 |
| 5,831,762 A * | 11/1998 | Baker et al. | | 359/353 |
| 5,939,706 A * | 8/1999 | Livingston | | 250/203.1 |
| 6,411,751 B1 * | 6/2002 | Giles et al. | | 385/16 |
| 6,495,827 B2 * | 12/2002 | Metcalf et al. | | 250/330 |
| 6,695,472 B1 * | 2/2004 | Nayer | | 374/141 |
| 6,836,381 B2 * | 12/2004 | Giles et al. | | 359/727 |
| 6,903,343 B2 * | 6/2005 | Amon et al. | | 250/353 |
| 7,597,489 B2 * | 10/2009 | Horak et al. | | 396/358 |
| 2010/0237226 A1 * | 9/2010 | Park | | 250/203.1 |

FOREIGN PATENT DOCUMENTS

EP 0 992 429 B1 9/2005

OTHER PUBLICATIONS

Park, UHECR Experiments, KIAS Workshop, May 24, 2005.

\* cited by examiner

*Primary Examiner* — Ricky D Shafer
(74) *Attorney, Agent, or Firm* — Jefferson IP Law, LLP

(57) ABSTRACT

An optical module that effectively observes a rapidly moving event or object is provided. The optical module includes first and second mirrors, and an optical signals detector, which are installed in a body thereof. The first mirror has a wide field of view and detects the event or object over a wide observing region. The second mirror observes the event or object detected by the first mirror at a high resolution. The focal length of the second mirror is greater than that of the first mirror. The optical signal detector detects an optical signal in light transmitted from the first mirror or the second mirror. The body forms apertures which correspond to the first and second mirrors, respectively and provides an optical path from the first and second mirrors to the optical signal detector. Therefore, the optical module can observe the event or object detected by the first mirror at a high resolution.

5 Claims, 3 Drawing Sheets

(B) An electric signal processing unit of the optical module (C) An ultra-violet and a near infra-red region detecting unit (A) Optical module

OPTICAL MODULE FOR OBSERVING EVENT OR OBJECT

PRIORITY

This application claims the benefit under 35 U.S.C. §119 (a) of a Korean patent application filed on Feb. 5, 2007 in the Korean Intellectual Property Office and assigned Serial no. 2007-0011663, and the entire disclosure of which is hereby incorporated by reference.

BACKGROUND OF THE INVENTION

1. Field of the Invention

The present invention relates to an optical system. More particularly, the present invention relates to an optical module that effectively observes a rapidly moving event or object, which is configured to include a first mirror having a wide field of view, for detecting the event or object over a wide observing region, and a second mirror, whose focal length is greater than that of the first mirror, for observing the event or object detected by the first mirror at a high resolution.

2. Description of the Related Art

Recently, global electrical phenomena in the Earth's atmosphere can be understood through observation of transient luminous events (TLE). Research has been performed that links these phenomena to the Earth's weather and to activities of the Sun and the Earth. This is because these phenomena, such as TLE, include a variety of information related to the Earth and the space.

However, it is not effective to perform global observation of an event or object, such as TLE, on the surface of the Earth. This is because there are few places that are higher than the location where the global electric phenomena have occurred. Also, although few suitable places do exist, they do not allow for a global observation of the phenomena to be carried out simultaneously.

As well, when space is observed near the Earth's polar orbit as a radio frequency is detected by a detector based on above the Earth or the space and images acquired through the detection are developed, such an observation has advantages in that information about the Earth atmosphere's electrical activities can substantially be provided from all topographical regions of the Earth during the total operation time of a satellite. To observe an event/object moved rapidly on the Earth's surface from the satellite requires proper optical systems. However, optical systems do not always observe the rapidly moving events/object on the Earth's surface.

Recently though, a Micro-Electro-Mechanical Systems (MEMS) has come into the limelight, where small mechanical devices, such as a sensor valve, gear, mirror, and semiconductor chip manipulator, etc., are combined with a computer. The MEMS is also called 'smart meter.' The MEMS is an apparatus of a silicon chip having a micro circuit. The MEMS is inserted into a mechanical apparatus, such as a mirror or sensor, when the mechanical apparatus is manufactured. The MEMS is employed in various systems, such as: an apparatus for inflating an air bag of a vehicle to comply with a user's weight and with the speed detected by the air bag sensor; a global position system sensor that can indicate a continuous trace of freight transportation and handling processes of the freight; a sensor that detects air flow change according to air resistance on the surface of airplane wings and performs interaction; an optical switching apparatus that outputs optical signals at 20 m/ns, a cooling/heating apparatus for operating a sensor; and a sensor installed in a building, for changing flexibility of matter that reacts to an atmosphere pressure. Considering features and advantages of MEMS technology, it is necessary that the technology be applied to an optical module for observing an event or an object.

SUMMARY OF THE INVENTION

Therefore, the present invention has been made in view of the above problems, and it is an object of the present invention to provide an optical module that effectively observes a rapidly moving event or object, which is configured to include a first mirror having a wide field of view, for detecting the event or object over a wide observing region, and a second mirror, whose focal length is greater than that of the first mirror, for observing the event or object detected by the first mirror at a high resolution.

In accordance with the present invention, the above and other objects can be accomplished by the provision of an optical module observing an event or an object, which includes: (1) a first mirror having a wide field of view, for detecting the event or object over a wide observing region; (2) at lease one or more second mirrors, whose focal length is greater than that of the first mirror, for observing the event or object detected by the first mirror at a high resolution; (3) an optical signal detector for detecting an optical signal in light transmitted from the first mirror or at least one or more second mirrors; and (4) a body including the first mirror, at least one or more second mirrors, and the optical signal detector therein, and forming apertures which correspond to the first mirror and at least one or more second mirrors, respectively, the body providing an optical path from the first mirror and at least one or more second mirrors to the optical signal detector.

Preferably, the optical module may further include a controller that: determines whether the detected event or object is an observation target; reads a location of the detected event or object when determining that the detected event or object is an observation target; and controls the first mirror and at least one or more second mirrors.

Preferably, the first mirror may include a digital mirror that is switched off after detecting the event or object.

Preferably, at least one or more second mirrors may include an analog mirror that can rapidly change its tilting angle.

Preferably, the first mirror and at least one or more second mirrors may change an optical path of an image to a certain path.

Preferably, at least one or more second mirrors may adjust the resolution to a certain value.

Preferably, the first mirror and at least one or more second mirrors may be operated through a Micro-Electro-Mechanical Systems (MEMS).

BRIEF DESCRIPTION OF THE DRAWINGS

The above and other objects, features, and other advantages of the present invention will be more clearly understood from the following detailed description of certain exemplary embodiments taken in conjunction with the accompanying drawings, in which:

FIG. 2 is views illustrating the operation principle of an optical module according to an exemplary embodiment of the present invention, in which FIG. 2A is a view describing a process for detecting an event or an object, particularly a rapidly moving event or an object, for example, TLE, using a first mirror having a wide field of view, and FIG. 2B is a view describing a process for observing the event or object detected by the process of FIG. 2A, using a second mirror having high resolution ability.

BRIEF DESCRIPTION OF SYMBOLS IN THE DRAWINGS

Figure 1:
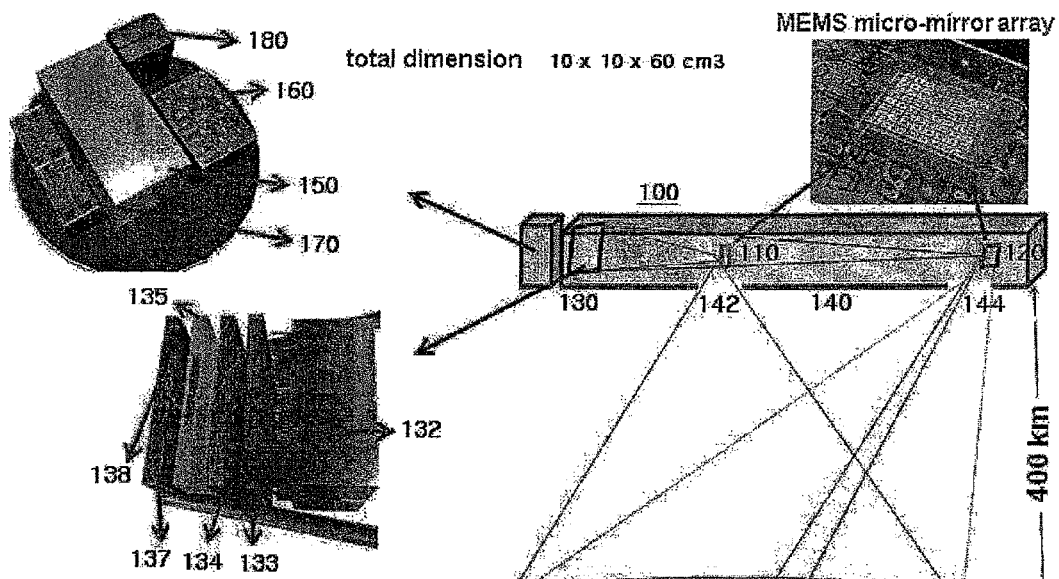
FIG. 1 is a view illustrating an optical module according to an exemplary embodiment of the present invention.

110: 1st mirror
120: 2nd mirror
130: light signal detector
132: ultraviolet region detector
133: analog board
134: digital board
135: PMT power supply
137: near infrared region detector
138: near infrared regions electronic device
140: body
142, 144: aperture
150: data storage unit
160: interface unit
170: controller
180: power supply
240: field of view
250: rapidly moving event or object

DETAILED DESCRIPTION OF EXEMPLARY EMBODIMENTS

Certain exemplary embodiments according to an optical module of the present invention will be described in detail with reference to the accompanying drawings.

FIGS. 1A-1C illustrate an optical module 100 according to an exemplary embodiment of the present invention. More particularly, FIG. 1A illustrates the optical module 100 configured in such a way that: a first mirror 110 detects an event or object over a wide observing region, based on its wide field of view; at least one or more second mirrors 120 observes the event or object detected by the first mirror 110 at a high resolution, in which the focal length of the second mirror 120 is greater than that of the first mirror 110; an optical signal detector 130 detects optical signals in light transmitted from the first mirror 110 or at least one or more second mirrors 120; and a body 140 includes the first mirror 110, at least one or more second mirrors 120, and the optical signal detector 130 therein. Here, the body 140 forms apertures 142 and 144 which correspond to the first mirror 110 and at least one or more second mirrors 120, respectively. As shown in FIG. 1B, the optical module 100 further includes a data storage unit 150 for storing the detected optical signal, an interface unit 160 for connecting between elements in the optical module 100, a controller 170 for controlling the entire operation of the system, and a power supply 180 for supplying power to the elements in the optical module 100.

The first mirror 110 serves to detect an event or an object, particularly a rapidly moving event or object (for example, a transient luminous event (TLE)), over a wide observing region using its wide field of view (FOV). As shown in FIG. 1A, the first mirror 110 is located close to the optical signal detector 130 in the body 140. Such a first mirror 110 has a relatively short focal length and the body 140 has an aperture 142 corresponding to the focal length. Specifically, the first mirror 110 is preferably implemented by a MEMS micro-mirror array that can be turned on/off in a digital fashion, to allow the second mirror 120 to observe the event or object detected by the first mirror 110 at high resolution. Also, as shown in FIG. 1A, the first mirror 110 is aligned such that it can change an optical path of an event image or an object image to a certain path to transmit it to the optical signal detector 130.

The second mirror 120 serves to observe in detail the event or the object (for example, a TLE) detected by the first mirror 110 using its high resolution ability. The second mirror 120 is located relatively far from the optical signal detector 130, compared to the first mirror 110, in the body 140. Such a second mirror 120 has a relatively long focal length and the body 140 has an aperture 144 corresponding to the focal length. Specifically, the second mirror 120 is preferably implemented by a MEMS micro-mirror array that can change its tilt angle in an analog fashion, such that it can effectively trace and observe, at a high resolution, the rapidly moving event or object detected by the first mirror 110. As shown in FIG. 1A, similar to the first mirror 110, the second mirror 120 is aligned such that it can change an optical path of an event image or an object image to a certain path to transmit it to the optical signal detector 130. And even though, as shown in FIG. 1A, in the exemplary embodiment of the present invention, the second mirror 120 is implemented by only one mirror, it will be easily appreciated that the second mirror 120 can be configured to include a plurality of mirrors.

The optical signal detector 130 serves to detect optical signals in light from the first mirror 110 or the second mirror 120. Such an optical signal detector 130 includes a ultra-violet region detecting unit for detecting an optical signal in the ultra-violet region and a near infra-red region detecting unit for detection an optical signal in the near infra-red region. The ultra-violet region detecting unit may be implemented by a multi anode photomultiplier tube (MAPMT). In an exemplary embodiment of the present invention as shown in FIG. 1C, the ultra-violet detecting unit includes: a ultra-violet region detector 132, configured by an MAPMT, for detecting an optical signal in the ultra-violet region; an analog board 132 and digital board 134 for operating the ultra-violet region detector 132; and a PMT power supply for supplying power to the MAPMT. Also, the near infra-red region detecting unit includes: a near infra-red region detector 137 for detecting an optical signal in the near infra-red region; and a near infra-red region electric device 138 for operating the infra-red region detector 137. In the exemplary embodiment of the present invention as shown in FIG. 1C, although the optical system is implemented to detect only the ultra-region signal and near infra-red region signal, it will be easily appreciated to the skilled person in the art that the spectral range of detectable optical signals would not be limited by the exemplary embodiment. As well, the electric device (that corresponds to an electric signal processing unit) for the optical signal detector 130 will not be limited by the exemplary embodiment of FIGS. 1A-1C.

The body 140 includes the first mirror 110, the second mirror 120, and the optical signal detector 130 therein. The body 140 provides an optical path from the first mirror 110 or the second mirror 120 to the optical signal detector 130. As well, the body 140 forms the apertures 142 and 144 at the lower portion of the first and second mirrors 110 and 120, respectively. Here, aperture collimators (not shown) may be further installed to the apertures 142 and 144, respectively.

As shown in FIG. 1B, the data storage unit 150 stores the detected optical signals and is implemented by a hard disk, etc. The interface unit 160 serves to connect between the devices in the system and is implemented by a bus interface, etc. The controller 170 refers to a CPU to control the entire operation of the system. Specifically, the controller 170 is operated in such a way that: a determination is made as to whether the event or object detected by the first mirror 110 is an observation target, using the electric signal processing units included in the optical signal detector 130; a location of the detected event or object is read when the detected event or object is an observation target; and the first and second mirrors are controlled based on the read location. Here, such a controller may be installed into the optical signal detector. The power supply 180 serves to supply power to the devices in the system.

The following is a description of the operation principle of an optical module according to the present invention, referring to FIGS. 2A and 2B.

Figure 2:
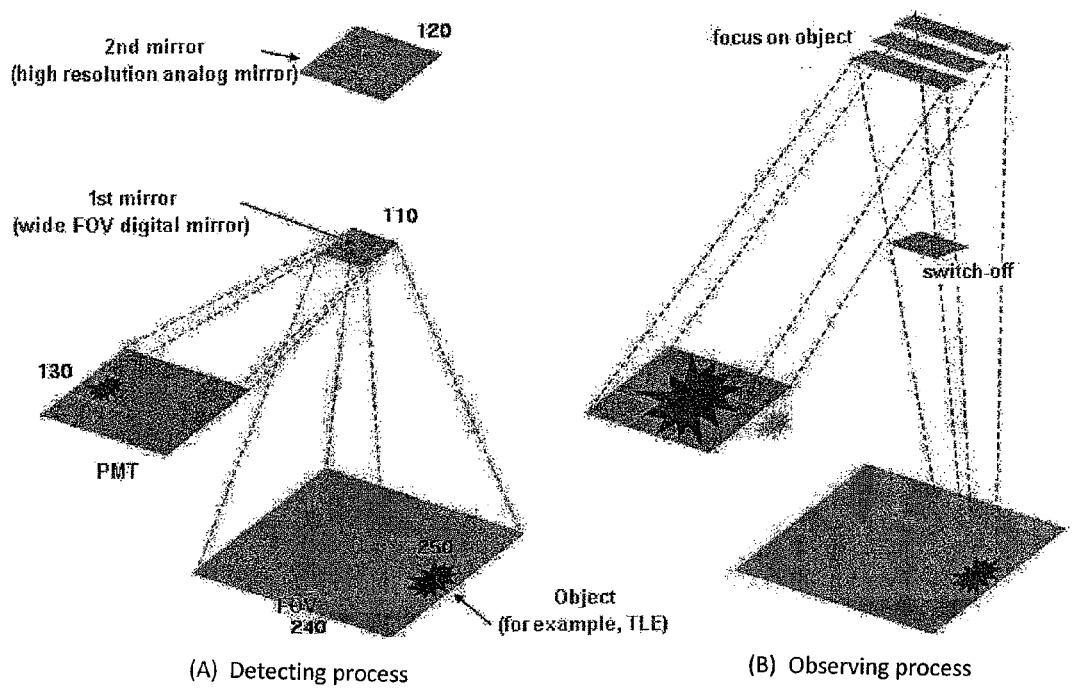

FIG. 2 is views illustrating the operation principle of an optical module according to an exemplary embodiment of the present invention. Specifically, FIG. 2A is a view illustrating a process for detecting an event or an object, particularly a rapidly moving event or an object, for example, TLE, over a wide observing region, using a first mirror having a wide field of view. As well, FIG. 2B is a view illustrating a process for observing in detail the event or object detected by the process of FIG. 2A, using a second mirror having a relatively long focal length and high resolution ability.

As shown in FIG. 2A, the optical module of the present invention first tries to detect an event or an object 250, for example, an transient luminous event (TLE), over a wired observing region, using the first mirror 110 of a wide field of view (FOV), which is referred to as a event/object detecting process. Here, since the first mirror 110 has features where its resolution is not relatively high but its view angle is large, it is proper to detect an event or an object over a wide observing region. The view angle 240 of the first mirror 110 is shown in FIG. 2A. The event or object 250 detected by the first mirror 110 is transmitted to the optical signal detector 130 to determine whether the detected event or object is an observing target. When the determination judges that the detected event or object 250 is an observing target, the process proceeds to an event/object observing process as shown in FIG. 2B.

In the event/object observing process, the detected event or object 250 of the detecting process of FIG. 2A is observed in detail through the second mirror 120 having a high resolution. It is preferable that the second mirror 120 can rapidly change the tilting angle in an analog fashion to trace and observe the rapidly moving event or object 250. In this process, the first mirror 110 must be switched off, and the second mirror 120 must focus on the detected event or object 250.

The following is a description of a specification of the optical module according to an exemplary embodiment of the present invention.

Figure 3:
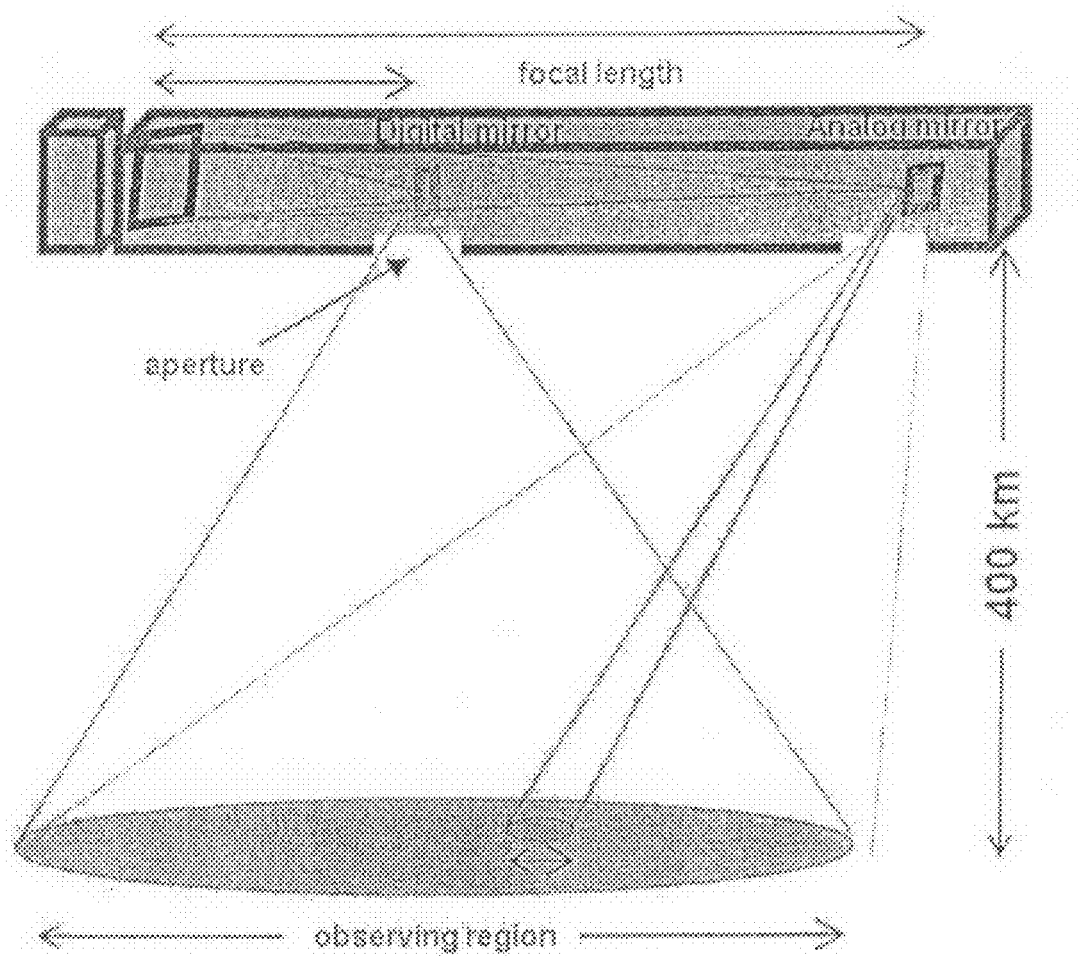
FIG. 3 is a view illustrating a specification of an optical module according to an exemplary embodiment of the present invention.

As shown in FIG. 3, the first mirror is implemented by a digital mirror, and the second mirror is implemented by an analog mirror. The specifications of the respective mirrors can be determined, based on the required conditions to perform the processes described through FIGS. 2A and 2B. In the specification, items for the mirrors are an observing region, focal length, field of view, aperture size, etc. The following Table 1 describes a specification of the first mirror as a digital mirror.

TABLE 1

| Observing region [km] | Focal length [cm] | Field of view (FOV) [Deg(°)] |
|---|---|---|
| 240 | 3.02 | 33.36 |
| 300 | 2.41 | 41.16 |

When the size of the observing region covered by the first mirror is determined, the focal length and the FOV can be determined. As well, an aperture size (not described in Table 1) can be also determined.

Following Table 2 describes a specification of the second mirror as an analog mirror.

TABLE 2

| Resolution of each pixel [km] | Observing region [km] | Focal length [cm] | Field of view (FOV) [Deg (°)] | Covering region [km] | Aperture size [cm] |
|---|---|---|---|---|---|
| 2 | 16 | 45.25 | 2.29 | 170.0 | 2.50 |
| 3 | 24 | 30.20 | 3.43 | 178.7 | 2.60 |
| 5 | 40 | 18.10 | 5.72 | 203.5 | 2.97 |

In Table 2, each pixel refers to a pixel of a photomultiplier tube (PMT) used as an optical signal detector and the resolution refers to a resolution of each pixel. The covering region refers to a region that can be covered by the second mirror, in which it is assumed that the second mirror has a tilt angle of ±6°. When the resolution of each pixel is determined by the second mirror, the observing region, focal length, FOV, aperture size, and covering region can be determined, accordingly.

As described above, the optical module according to the present invention is configured to include a first mirror having a wide field of view, for detecting the event or object over a wide observing region, and at least one or more second mirrors, each of whose focal length is greater than that of the first mirror, for observing the event or object detected by the first mirror at a high resolution, thereby effectively observing the event or the object.

Although the exemplary embodiments of the present invention have been disclosed for illustrative purposes, those skilled in the art will appreciate that various modifications, additions, and substitutions are possible, without departing from the scope and spirit of the invention as disclosed in the accompanying claims and their equivalents.

What is claimed is:

1. An optical module observing at least one of an event and an object comprising:
   a first mirror having a wide field of view, for detecting at least one of the event and the object over a wide observing region;
   at least one second mirror, whose focal length is greater than that of the first mirror, for observing the at least one of the event and the object detected by the first mirror at a high resolution;
   an optical signal detector for detecting an optical signal in light transmitted from at least one of the first mirror and the at least one second mirror; and
   a body including the first mirror, the at least one second mirror, and the optical signal detector therein, and forming apertures which correspond to the first mirror and the at least one second mirror, respectively, the body providing an optical path from the first mirror and the at least one second mirror to the optical signal detector,
   wherein the first mirror comprises a digital mirror that is switched off after detecting the at least one of the event and the object, and
   wherein the at least one second mirror comprises an analog mirror that rapidly changes its tilting angle.

2. The optical module according to claim 1, further comprising a controller for determining whether the at least one of the detected event and object is an observation target, for reading a location of the at least one of the detected event and object when determining that the at least one of the detected event and object is an observation target, and for controlling the first mirror and the at least one or more second mirror.

3. The optical module according to claim 1, wherein the first mirror and the at least one second mirror change the optical path of an image to a certain path.

4. The optical module according to claim 3, wherein the first mirror and the at least one second mirror are operated through a Micro-Electro-Mechanical Systems (MEMS).

5. The optical module according to claim 1, wherein the at least one second mirror adjusts the resolution to a certain value.

* * * * *